March 1, 1932.  R. B. AYER  1,848,092

ELECTRIC POWER CONVERTING APPARATUS

Filed Dec. 20, 1930

Inventor:
Raymond B. Ayer,
by Charles V. Tullar
His Attorney.

Patented Mar. 1, 1932

1,848,092

UNITED STATES PATENT OFFICE

RAYMOND B. AYER, OF SCHENECTADY, NEW YORK, ASSIGNOR TO GENERAL ELECTRIC COMPANY, A CORPORATION OF NEW YORK

ELECTRIC POWER CONVERTING APPARATUS

Application filed December 20, 1930. Serial No. 503,751.

My invention relates to electric power converting apparatus and more particularly to such apparatus including electric valves for converting alternating current into direct current.

The conversion of alternating current into direct current by means of electric valves of any of several types has come into extensive use in electrical industry. One arrangement for effecting this conversion is described and claimed in United States Letters Patent No. 1,836,891, granted December 15, 1931, upon the application of Acheson and Zehner. There is disclosed in the above-mentioned patent apparatus by means of which any desired load voltage characteristic may be obtained. My invention constitutes an improvement upon that covered by the above patent.

It is an object of my invention to provide an improved electric power converting apparatus utilizing electric valves, by means of which the voltage of the direct current circuit may be controlled over wide limits.

It is a further object of my invention to provide an improved electric power converting apparatus utilizing electric valves by means of which any desired load voltage characteristic may be obtained at any predetermined load voltage over a wide range of voltage variation.

In accordance with my invention, I utilize a pair of grid controlled electric valves for transmitting the power from an alternating current circuit to a direct current circuit and control the grid potential of these valves in accordance with variations in the current in the direct current circuit, and with variations in a predetermined portion of the voltage of the direct current circuit.

Figure 1:
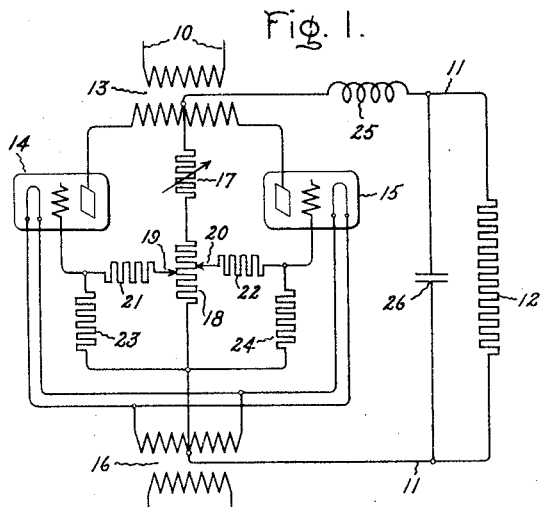
Figure 2:
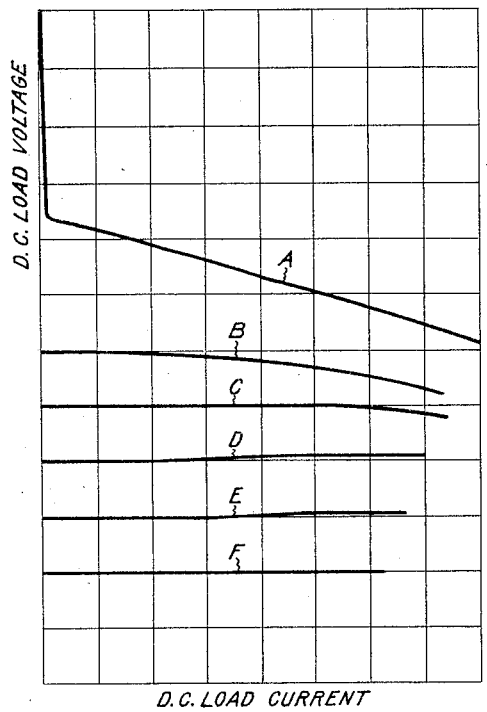

For a better understanding of my invention together with other and further objects thereof, reference is had to the following description taken in connection with the accompanying drawings and its scope will be pointed out in the appended claims. Fig. 1 of the accompanying drawings diagrammatically illustrates one embodiment of my invention, while certain operating characteristics thereof are shown in Fig. 2.

Referring more particularly to Fig. 1 of the accompanying drawings, I have illustrated an apparatus for receiving alternating current from the circuit 10, converting it into direct current, and delivering it to the receiving circuit 11, which is adapted to supply a load device 12. This apparatus comprises a transformer 13 and electric valves 14 and 15 each provided with an anode, a cathode and a control grid. The primary winding of the transformer 13 is connected to the supply circuit 10, while the secondary is provided with an electrical midpoint connected to the negative side of the direct current circuit. The outer terminals of this secondary winding are connected to the anodes of the electric valves 14 and 15, while the cathodes of these valves are connected together and to the positive side of the direct current circuit through opposite halves of the secondary winding of the filament transformer 16. The primary winding of the transformer 16 may be energized from any suitable alternating current circuit such, for example as the circuit 10. The valves 14 and 15 may be of any of the several types well known in the art, but I prefer to use valves of the vapor electric discharge type in which the starting of current in the valves is determined by the potential of the control grid but in which current through the valve may be interrupted only by reducing its anode potential below its critical value. A potentiometer comprising resistors 17 and 18, either or both of which may be variable, is connected across the direct current circuit 11. As shown, the resistor 18 is provided with adjustable connections 19 and 20 connected to the control grids of the electric valves 14 and 15 through resistors 21 and 22 respectively. The grids of the valves 14 and 15 may be also connected to their respective cathodes through resistors 23 and 24 respectively. If desired, a reactor 25 may be connected in series with the direct current circuit 11 and a capacitor 26 connected across the circuit in order to smooth out any ripples in the voltage of this circuit.

The general principle of operation of a full wave rectifier utilizing a pair of electric valves is so well understood by those skilled in the art that a detailed explanation is not considered necessary. It has been found, however, that by providing the electric valves with control grids as described above, the characteristics of the circuit may be somewhat changed. Referring now to Fig. 2, curve A represents the variation of the voltage of the direct current circuit 11 with variation in load current and with the control grids of the electric valves connected directly to their respective anodes. With this connection, the grid potentials are positive whenever the anode potentials are positive and each tube is conducting complete half waves of alternating current. It is seen that this voltage regulation is very poor. With the above described circuit, however, the voltage regulation may be materially improved and the load voltage may be independently controlled at any desired value. It will be noticed that the midpoint of the secondary winding of the transformer 13 is negative with respect to each of its outer terminals when the valve associated with the particular outer terminal is conducting. Hence, a small negative bias is maintained on each of the grids of the valves 14 and 15 by means of the potentiometer 17—18 and the variable connections 19 and 20. Whenever electric valves 14 and 15 conduct current, their contained vapor becomes ionized with the result that a certain quantity of positive ions are liberated. When current flows in these valves and their control grids are charged negatively, free positive ions are attracted by the grid with a resulting positive ion current flow in the grid circuit. This flow of positive ion current in the resistors 21 and 22 and the lower portion of resistor 18 produces a potential drop in these resistors which is opposed to the negative bias impressed upon the control grid from the potentiometer 17—18 but is usually smaller in magnitude. The resulting potential of the control grids of electric valves 14 and 15 is then the resultant of the negative bias derived from potentiometer 17—18 and the positive potential drop in the resistors 21, 22 and 18 and it is this resultant potential which controls the conductivity of electric valves 14 and 15. Thus, for a given setting of the adjustable connections 19 and 20, the resultant negative bias on the control grids of the valves 14 and 15 will maintain them non-conducting for a small initial portion of their respective half cycles of alternating current, and thus reduce the average voltage of the direct current circuit 11. The setting of the adjustable connections 19 and 20, will, of course, determine the magnitude of this negative bias of the control grids and thus control the portions of their respective half cycles, during which the valves 14 and 15 are conducting. In this way the voltage of the direct current circuit 11 can be controlled at any desired value.

Although the average voltage of the circuit 11 is reduced by the addition of the above described grid circuit, it has been found that its voltage regulation is materially improved. This may be explained by the fact that in case the voltage of the circuit 11 tends to drop below the value corresponding to the setting of the adjustable connections 19 and 20, the negative bias applied to the grids of the valves 14 and 15 from the resistor 18 will correspondingly decrease. As a result of this decrease in negative bias, each valve will become conducting at an earlier point in its respective half cycle which will in turn increase not only the average value of the potential of the circuit 11 directly, but also the positive ion current which will tend to still further neutralize the negative bias derived from the resistor 18 until an equilibrium condition is reached. Obviously a reverse operation will take place in case of an increase of voltage of the circuit 11. It will be obvious that the same results may be obtained by varying the value of resistance of the variable resistor 17. In some cases it may be found desirable to make the resistors 21 and 22 variable in order to provide more flexible control. The resistors 23 and 24 preferably have a very high resistance so that they do not affect the above described operation, but serve merely to connect the grids of the valves 14 and 15 to their respective cathodes in case the main grid circuits should be accidentally interrupted.

The voltage regulation curves of the above described circuit are shown by the curves B, C, D, E, and F of Fig. 2 corresponding, respectively, to successively decreasing values of the resistance of the variable resistor 17. It will be obvious that the resistances of the several resistors 17 to 24 inclusive will be determined by the control characteristics of electric valves 14 and 15 as well as by the voltage of the circuit to which the apparatus is supplying power.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States, is:—

1. In combination with an electric power converting apparatus including a direct current circuit, an alternating current circuit and an electric valve provided with a control grid for transmitting power therebetween, means for effecting a predetermined load voltage characteristic of said direct current circuit comprising means for impressing upon said control grid a predetermined portion of the potential of said direct current circuit, and means for impressing upon said control grid a potential of opposite polarity and variable in accordance with the ionization in said valve.

2. In combination, an alternating current circuit, an inductive winding connected thereto, a direct current circuit one side of which is connected to the electrical midpoint of said inductive winding, a pair of electric valves provided with control grids and connected between the outer terminals of said inductive winding and the other side of the direct current circuit, means for effecting a predetermined load voltage characteristic of said direct current circuit comprising a potentiometer connected across said direct current circuit and adjustable connections including resistances from said control grids to said potentiometer, and a second connection, including a high resistance between each control grid and its corresponding cathode.

In witness whereof, I have hereto set my hand this 19th day of December, 1930.

RAYMOND B. AYER.